(12) United States Patent
Alsolami

(10) Patent No.: US 11,048,787 B2
(45) Date of Patent: *Jun. 29, 2021

(54) SECURING ELECTRONIC DOCUMENTS WITH FINGERPRINT/BIOMETRIC DATA

(71) Applicant: King Abdulaziz University, Jeddah (SA)

(72) Inventor: Fahad Alsolami, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,314

(22) Filed: Oct. 13, 2020

(65) Prior Publication Data

US 2021/0026942 A1 Jan. 28, 2021

Related U.S. Application Data

(63) Continuation of application No. 16/293,265, filed on Mar. 5, 2019.

(51) Int. Cl.
*G06K 9/00* (2006.01)
*G06F 7/04* (2006.01)
(Continued)

(52) U.S. Cl.
CPC .............. *G06F 21/32* (2013.01); *G06F 21/40* (2013.01); *G06K 9/00073* (2013.01); *G06K 9/00093* (2013.01); *H04L 9/085* (2013.01)

(58) Field of Classification Search
USPC .......................................... 382/115; 726/19
See application file for complete search history.

(56) References Cited

U.S. PATENT DOCUMENTS

| 5,610,982 | A | 3/1997 | Micali | |
|---|---|---|---|---|
| 6,182,214 | B1 * | 1/2001 | Hardjono | ................ H04L 9/085 380/255 |

(Continued)

OTHER PUBLICATIONS

You et al, "A Fingerprint and Threshold Scheme-Based Key generation Method", Nov. 2010, 5th International Conference on Computer Sciences and Convergence Information Technology, pp. 615-619 (Year: 2010).*

(Continued)

*Primary Examiner* — Kathleen Y Dulaney
(74) *Attorney, Agent, or Firm* — Oblon, McClelland, Maier & Neustadt, L.L.P.

(57) ABSTRACT

A system and methods for authenticating an electronic signature using a biometric fingerprint includes registering a subscriber to the service. The subscriber asks document signers enter their fingerprint(s) by a fingerprint reader. The fingerprint data is applied to a fingerprint matcher which generates a gallery pair table of fingerprint minutiae for each signer. A secret user ID or operation number is generated. A sharing module splits the fingerprint information into N shares and generates a threshold number S. The secret is applied to the sharing module and N shares of the secret are generated. The N shares of fingerprint data are each combined with one share the secret to form N combined shares. The N combined shares are each stored in different cloud storage locations. Retrieval of the secret to authenticate the signers requires S signers to enter their fingerprints and S combined shares to be downloaded from the clouds.

9 Claims, 11 Drawing Sheets

(51) Int. Cl.
*G06F 21/32* (2013.01)
*H04L 9/08* (2006.01)
*G06F 21/40* (2013.01)

(56) References Cited

U.S. PATENT DOCUMENTS

| | | | | |
|---|---|---|---|---|
| 7,093,133 | B2* | 8/2006 | Hopkins | H04L 9/302 |
| | | | | 713/176 |
| 8,572,395 | B2* | 10/2013 | Ito | G06F 21/31 |
| | | | | 713/185 |
| 9,692,594 | B2* | 6/2017 | Hakoda | G06F 21/6245 |
| 9,935,947 | B1* | 4/2018 | Machani | H04L 67/1002 |
| 10,057,068 | B2* | 8/2018 | Takahashi | H04L 9/3263 |
| 10,719,594 | B2* | 7/2020 | Eldefrawy | H04L 9/008 |
| 2001/0032096 | A1* | 10/2001 | Uchida | G06Q 10/083 |
| | | | | 382/115 |
| 2005/0204129 | A1* | 9/2005 | Sudia | G06Q 20/02 |
| | | | | 713/158 |
| 2008/0019573 | A1* | 1/2008 | Baltatu | G06F 21/32 |
| | | | | 382/115 |
| 2009/0310779 | A1* | 12/2009 | Lam | G06K 9/00093 |
| | | | | 380/46 |
| 2014/0089683 | A1* | 3/2014 | Miller | G06F 21/602 |
| | | | | 713/193 |
| 2017/0134375 | A1* | 5/2017 | Wagner | H04L 63/0807 |
| 2017/0264430 | A1* | 9/2017 | Robertson | H04L 9/083 |
| 2018/0176212 | A1* | 6/2018 | Nair | G06F 21/32 |
| 2018/0270226 | A1* | 9/2018 | Agrawal | G06F 21/32 |
| 2020/0285720 | A1* | 9/2020 | Alsolami | G06F 21/32 |

OTHER PUBLICATIONS

Je-Gyeong Jo, et al., "Biometric Digital Signature Key Generation and Cryptography Communication Based on Fingerprint", FAW, LNCS, vol. 4613, 2007, pp. 38-49.
Kai Cao, et al., "Fingerprint Matching by Incorporating Minutiae Discr minability", International Joint Conference on Biometrics (UJCB), Oct. 11-13, 2011, 6 pages.
Adi Shamir, "How to Share a Secret" Communications of the ACM, Programming Techniques, vol. 22, No. 11, Nov. 1979, pp. 612-613.
Craig I. Watson, et al., "User's Guide to NIST Biometric Image Software (NBIS)", NIST Interagency/Internal Report (NISTIR), Report Number: 7392, Jan. 21, 2007, 207 pages.
"P2000 Fingerprint Device", P2000 Fingerprint Reader Overview, tittp://www.zvetcobiometrics.corn/Products/P2000/overview.php, Jan. 2, 2019, 2 pages.

* cited by examiner

| k | j | ⊕_{kj} | share of d_{kj} | share of β_1 | share of β_2 | share of secret (User ID) |

FIG. 2

| k | j | ⊕_{kj} | share of d_{kj} | share of β_1 | share of β_2 | share of secret (operation number) |

FIG. 3

SECURING ELECTRONIC DOCUMENTS WITH FINGERPRINT/BIOMETRIC DATA

BACKGROUND

Technical Field

The present disclosure is directed to a system, method and non-transitory computer readable medium having instructions stored therein that, when executed by one or more processors, causes the one or more processors to perform electronic signature authentication method using a biometric fingerprint. For example, shares of fingerprint gallery pair data are combined with shares of a secret number and each combined share is stored in a different cloud storage location. A threshold number of combined shares are preferably downloaded from the cloud storage locations to retrieve the secret number and unlock the document.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

An electronic signature is a quick and convenient tool for legal documents and payments as business styles have changed from traditional paper-based to computer-based. Use of an electronic signature is growing for many applications in government and private organizations. However, non-repudiation and authentication issues remain a concern for electronic signatures. The need for a secure electronic signature is especially prominent for financial services, when an electronic signature must be taken from group of people at one time in order to cash checks or perform an operation approval.

The method, computer program product and system for securing a document with fingerprint/biometric data (hereinafter the "SignShare service") of the present disclosure overcomes these obstacles by securing document access with biometric (e.g., fingerprint) data and a secret (operation number/user ID) and by distributing multiple shares of the data (fingerprint and secret) into multiple clouds in parallel. During the matching/signing process, only a threshold number of shares of fingerprint data are needed to return the secret in order to authenticate the electronic signature.

SUMMARY

In an exemplary embodiment, a system is described using an electronic signature such as a biometric fingerprint. The system records fingerprints from at least one signer, extracts minutiae data from the fingerprint and generates a gallery table $G_i$ of the fingerprint data. The gallery table data is applied to a sharing module which splits the data into N shares and generates a threshold number S which determines how many shares must be downloaded to authenticate a fingerprint. The system further protects the fingerprint data by generating a secret (ID or operation number), splitting the secret into N shares and combining a share of the secret with a share of the fingerprint data. The system then transmits each share to a separate cloud storage location.

Retrieval of the fingerprint data requires a signer to enter his/her fingerprint to a fingerprint reader. The system creates a probe table $T_i$ for the fingerprint. SignShare then downloads an S number of combined shares from the cloud storage locations, retrieves the original gallery pair table $G_i$, matches the original gallery pair table $G_i$ against the signer's fingerprint probe table $T_i$ to release the secret. SignShare then prints the secret to authenticate the fingerprints of the signer(s).

In another exemplary embodiment, a SignShare method for authenticating an electronic signature using a biometric fingerprint is presented.

In a third exemplary embodiment, a non-transitory computer readable medium having instructions stored therein that, when executed by one or more processors, causes the one or more processors to perform SignShare method for authenticating an electronic signature using a biometric fingerprint is described.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2 is an exemplary row of a gallery pair table for the single protocol, according to certain embodiments FIG. 3 is an exemplary row of a gallery pair table for the group protocol, according to certain embodiments.

DETAILED DESCRIPTION

Figure 1B:
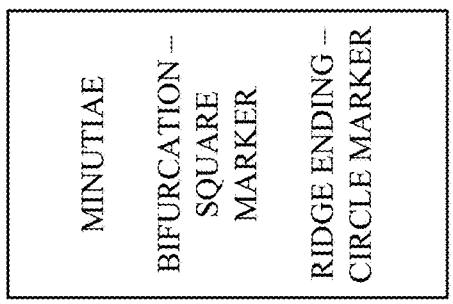
FIG. 1B is an illustration of the convention for minutiae identification, according to certain embodiments.
Figure 1B:
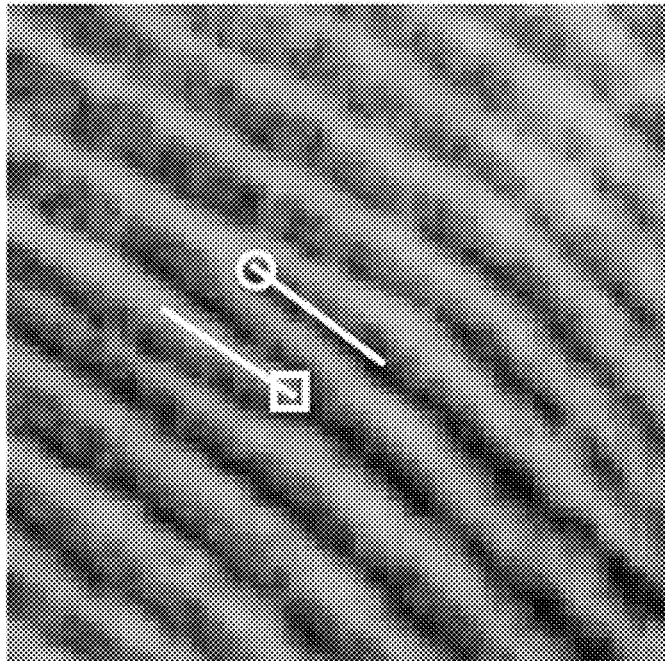

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for authenticating an electronic signature using a biometric fingerprint, an electronic signature authentication using a biometric fingerprint and a non-transitory computer readable medium having instructions stored therein that, when executed by one or more processors, causes the one or more processors to perform electronic signature authentication method using a biometric fingerprint.

A biometric fingerprint is one which is read by a fingerprint reader which can distinguish between real fingers and simulated fingerprint ridges by measuring depth characteristics, such as by using multispectral imaging. A non-limiting example of a fingerprint reader which reads biometric fingerprints is the P2000 Fingerprint Device sold by Zvetco Biometrics. http://www.zvetcobiometrics.comProducts/P2000/overview.php.

SignShare enables securing an electronic signature by using a fingerprint as a signature to replace a handwriting signature. SignShare provides non-repudiation, authentication, security, and privacy to secure electronic documents.

Non-repudiation refers to a situation where a signer cannot successfully dispute the authorship or the validity of his/her signature on an associated contract. The term is often seen in a legal setting when the authenticity of a signature is being challenged. In such an instance, the authenticity is being "repudiated". Non-repudiation involves associating actions or changes with a unique individual. For example, a secure area may use a key card access system. Here, non-repudiation would be violated if key cards were shared or if lost and stolen cards were not immediately reported. Similarly, the owner of a computer account must not allow others to use the account, such as by giving away their password, and a policy should be implemented to enforce this. This prevents the owner of the account from repudiating actions performed by his/her account.

In digital security, non-repudiation means:

1. A service that provides proof of the integrity and origin of data.

2. An authentication that can be said to be genuine with high confidence.

The SignShare service provides non-repudiation and authentication of documents by using biometric data, such as a fingerprint. When a user wants to sign a document, such as a contract, a user must provide his/her fingerprint data. As a result, a user cannot deny the validity of his/her signature at a later time. SignShare secures the fingerprint data by using a secret sharing scheme to generate shares of fingerprint data, combining the shares with a secret (user ID or operation number), storing of each combined share at a different one of multiple storage locations. Retrieval of the secret includes downloading a threshold number of shares and an optional second factor authentication.

A document may be a credit card signature, a treaty, an acknowledgement, a lease, a contract for sale, a contract to purchase, a contract to deliver goods, a will, a treaty, a partnership agreement, a check, a transaction, or any securable document which requires a signature or its equivalent for verification of the authenticity of a signer. The word "document" is not limited by the examples above.

Biometric data, such as a fingerprint, is an acceptable tool for authentication and confirmation of user identity. SignShare adds an additional level of security by utilizing a secret sharing scheme in order to authenticate the biometric data as belonging to the signer of a document. (See: Shamir, Adi. "How to share a secret." Communications of the ACM 22.11 (1979): 612-613, incorporated herein by reference in its entirety).

Aspects of the present disclosure use the standard NIST Bozorth matcher algorithm (See: C. I. Watson et al., User's Guide to NIST Biometric Image Software (NBIS), incorporated herein by reference in its entirety). The NIST Bozorth matcher algorithm is a minutiae based fingerprint matching system. It takes a fingerprint image and locates features in the ridges and furrows of the friction skin, called minutiae. Points are detected where ridges end (called a ridge ending) or split (called a ridge bifurcation), and their location, type, orientation, and quality are stored and used for search. There are 100 minutiae on a typical print, and matching takes place on these points rather than the approximately 250,000 pixels in the fingerprint image.

Figure 1A:
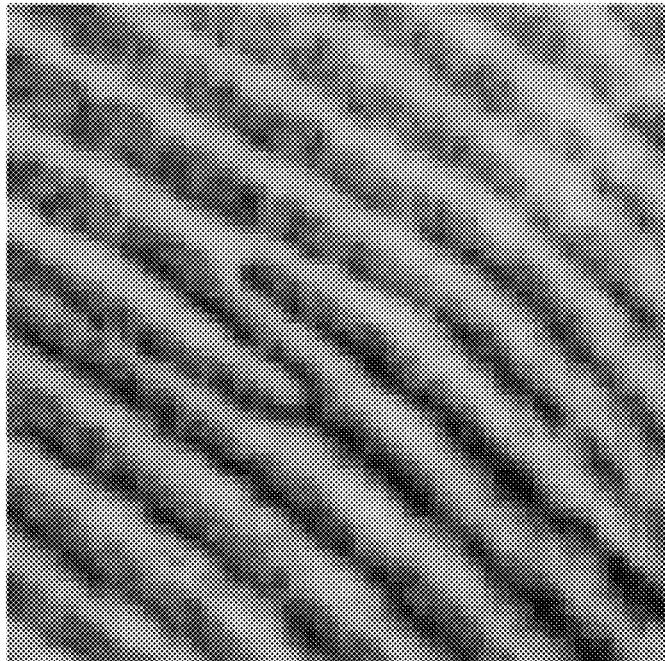
FIG. 1A is an illustration of minutiae features on a fingerprint, according to certain embodiments.

Traditionally, two fingerprints are compared using discrete minutiae features. In order to search and match fingerprints, the coordinate location and the orientation of the ridge at each minutia point are recorded. FIGS. 1A and 1B show an example of the two types of minutiae. The original fingerprint image can be shown in FIG. 1A, showing a bifurcation and a ridge which ends. The minutiae are marked in FIG. 1B by the bifurcation point (square) and the ridge ending point (circle). The tails on the markers point in the direction of the minutiae's orientation.

The location of each minutia is represented by a coordinate location within the fingerprint's image. The NIST standard specifies units of distance in terms of 0.01 mm from an origin in the bottom left corner of the image. Minutiae orientation is represented in degrees, with zero degrees pointing horizontal and to the right, and increasing degrees proceeding counter-clockwise. The orientation of a ridge ending is determined by measuring the angle between the horizontal axis and the line starting at the minutia point and running through the middle of the ridge. The orientation of a bifurcation is determined by measuring the angle $\theta$ between the horizontal axis and the line starting at the minutia point and running through the middle of the intervening valley between the bifurcating ridges.

Figure 1C:
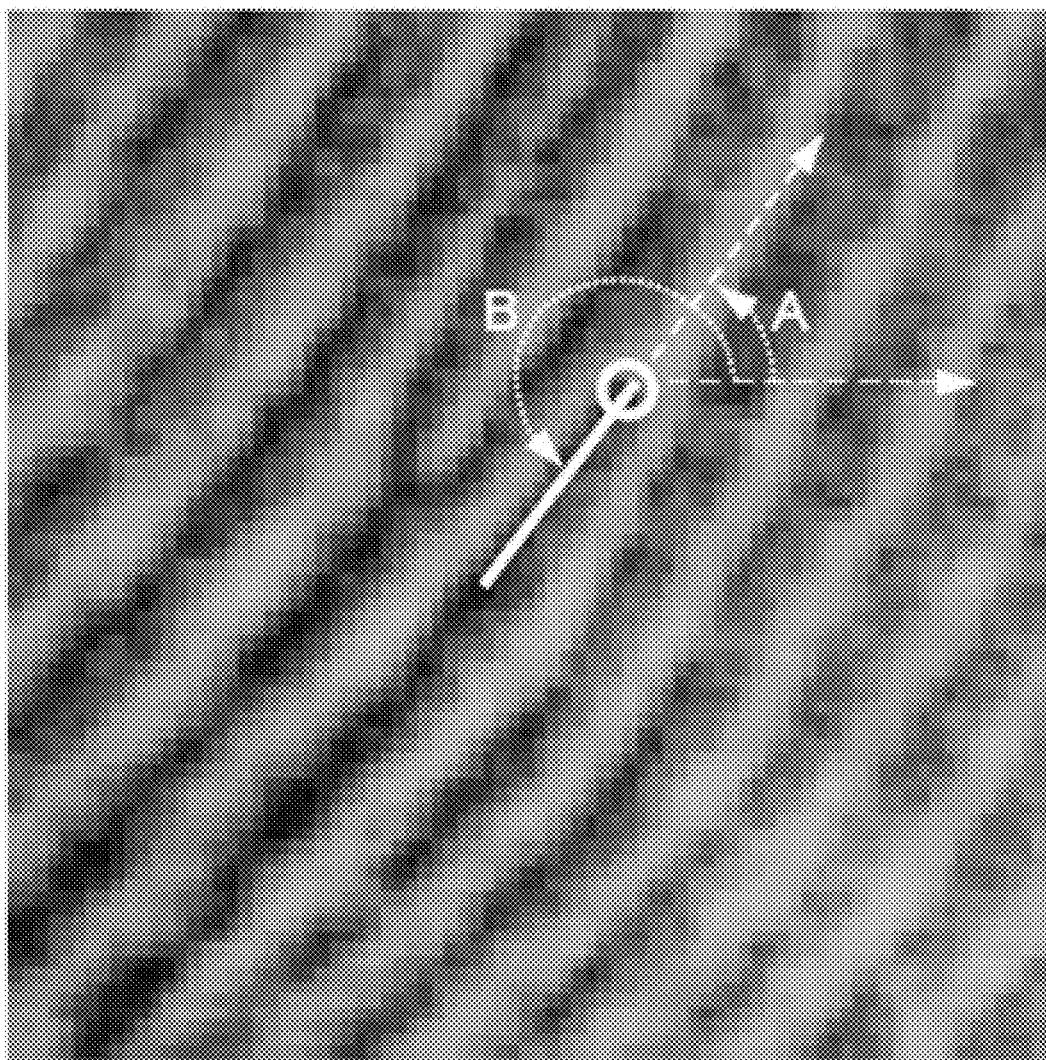
FIG. 1C illustrates identification of the convention for angular orientation of minutiae, according to certain embodiments.

The minutiae in FIG. 1C are overlaid by a coordinate system which illustrates the line to which the angle of orientation $\theta$ is measured. Each minutia symbol is comprised of a circle or square, as shown in FIG. 1B, marking the location of the minutia point, and the line or tail proceeding from the circle or square is projected along either the ridge ending's ridge, or the bifurcation's valley. The angle of orientation as specified by the NIST standard is marked as angle "$\theta$" in the illustration.

Figure 1D:
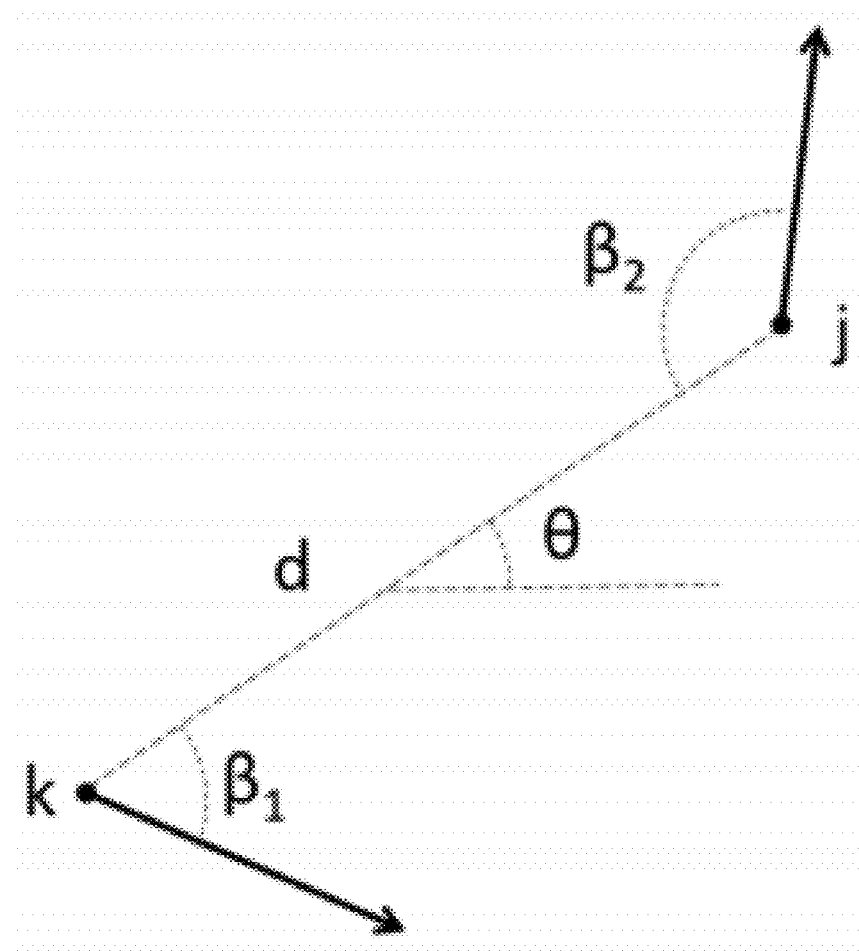
FIG. 1D illustrates the convention for portraying the relationships between minutiae, according to certain embodiments.

The Bozorth algorithm builds a table G of pairs of minutiae $m_i$, for two minutiae in the fingerprint. Gallery tables G are constructed for each fingerprint individually. The entries of the table consist of relative measurements between all pairs of minutiae for a fingerprint. More precisely, for two minutiae, k and j, it computes the following quantities: the distance $d_{kj}$ between two minutiae k and j; the angles $\beta_1$ and $\beta_2$ calculated relative to the connection line between k and j; and the angle $\theta_{kj}$ between the horizontal and the line connecting the two minutiae k and j as shown in FIG. 1D. A row in the gallery table is designated $g_i$. (See: Durmuth, M., Oswald, D., Pastewka, N., "Side-Channel Attacks on Fingerprint Matching Algorithms", TrustED'16, Oct. 28, 2016, Vienna, Austria, DOI: http://dx.doi.org/10.1145/2995289.2995294, https://www.cs.bham.ac.uk/~oswalddf/publications2016_fingerprint_sca.pdf, incorporated herein by reference in its entirety).

The secret sharing scheme uses a (s, n) threshold scheme with n≥2s−1, which provides a robust key management scheme. The original key can be recovered even when n/2=s−1 of the n pieces are destroyed, but opponents cannot reconstruct the key even when security breaches expose the remaining n/2=s−1 of the remaining s pieces.

For example, to provide security to a data record, D, the secret sharing scheme divides D into n pieces, $D_1$, $D_2$, ..., $D_n$ in such a way that:

(1) knowledge of any s or more $D_i$ pieces makes D easily computable;

(2) knowledge of any s−1 or fewer $D_i$ pieces leaves D completely undetermined (in the sense that all its possible values are equally likely).

When using the (s,n) threshold scheme, there are n pieces and any s of them can be used to reconstruct the secret.

The secret sharing scheme is based on polynomial interpolation: given s points in the 2-dimensional plane $(x_1, y_1), \ldots, (x_s, y_s)$. with distinct $x_i$'s, there is one and only one polynomial f(x) of degree s−1 such that $f(x_i)=y_i$ for all i. Without loss of generality, it can be assumed that the data D is (or can be made) a number. To divide it into pieces $D_i$, choose a random s−1 degree polynomial $f(x)=a_0+a_1x+\ldots a_{k-1}x^{s-1}$ in which $a_0=D$, and evaluate: $D_1=f(1), \ldots, D_i=f(i), \ldots, D_n=f(n)$.

Given any subset of s of these $D_i$ values (together with their identifying indices), the coefficients of f(x) can be found by interpolation, and then D=f(0) can be evaluated Knowledge of just s−1 of these values, on the other hand, does not suffice in order to calculate D.

To make this claim more precise, modular arithmetic is used instead of real arithmetic. The set of integers modulo a prime number p forms a field in which interpolation is possible. Given an integer valued data D, we pick a prime p which is bigger than both D and n. The coefficients $a_1 \ldots, a_{s-1}$ in f(x) are randomly chosen from a uniform distribution over the integers in [O, p), and the values $D_1 \ldots, D_n$ are computed modulo p.

Now assume that s−1 of these n pieces are revealed to an opponent. For each candidate value D' in [O, p), the opponent can construct one and only one polynomial f'(x) of degree s−1 such that f'(0)=D' and $f'(i)=D_i$ for the s−1 given arguments. By construction, these p possible polynomials are equally likely, and thus there is absolutely nothing the opponent can deduce about the real value of D.

SignShare provides security and privacy to the biometric (fingerprint) data by applying the secret sharing scheme on the fingerprint data and splitting it into multiple shares.

The secret sharing scheme above as applied to SignShare fingerprint data is summarized below:
Choose the degree s−1 of a polynomial
Set the coefficient $a_0$ equal to the secret to be shared.
Randomly choose s−1 coefficients $a_1, a_2, \ldots, a_{s-1}$
The polynomial is now:

$$f(x)=a_{s-1}x^{s-1}+a_{s-2}x^{s-2}+\ldots+a_1x^1+a_0$$

In order to reconstruct the secret:
Select at least s values of q(x) at distinct x's. S of these points (x, f(x)) can be used to reconstruct the polynomial and recover $a_0$ which is equal to the secret.

Use Lagrange polynomials:
Given s points $(x_1, f(x_1)) \ldots (x_s, f(x_s))$, solve $$\sum_{j=1}^{k} f(x_j) \prod_{\substack{l \le m \le k \\ m \ne j}} \frac{(x-x_m)}{(x_j-x_m)} = a_{s-1}+a_{s-2}x^{s-1}+\ldots+a_jx^1+a_0$$

where the symbol Π is the product operator and k=s in the term 1≤m≤k.

The constant term $a_0$ is the secret.

The secret sharing scheme is also applied to a secret, such as a user ID, and shares of the secret are combined with the shares of the fingerprint data. The combined shares are stored at multiple cloud storage locations, where each cloud stores one share of data. Each share is secure and reveals no information about the underlying data.

During a matching/signing process, the secret hidden inside the fingerprint data must be released and computed in order to match a threshold secret on record. A secret may be private pin, a private key, password, user ID, an image, a hash, an answer to a secret question, random number, a pseudo-random number or the like. A threshold is the number of shares which must be retrieved to release the secret.

SignShare applies the secret sharing scheme to split the fingerprint features (pair-table) and the secret (user ID or operation number) into multiple shares (for example N shares) while at the same time, the secret sharing scheme determines the threshold number of shares (for example S shares) where N is greater than or equal to S. In the signing process, SignShare requires the threshold number of shares S in order to reconstruct the original secret and perform the signature. Reference to the secret sharing scheme of Shamir shows that the number of threshold shares S is related to the number of possible signers N (group members) by the equation: N≥2S−1, where N and S are integers greater than 1, and where N is the number of minutiae pairs. (See also: Cao, K. Liu. E.; Pang, L.; Liang, J.; Tian, J. "Fingerprint matching by incorporating minutiae discriminability", 2011 IEEE:

http://www.csis.pace.edu/~ctappert/dps/2011IJCB/papers/216.pdf, incorporated herein by reference in its entirety.

The architecture of SignShare during the enrollment process and the matching/signing process is now described.

SignShare has two protocols, a single protocol and a group protocol. The single protocol is defined as performing a signature for one person while the group protocol is defined as performing a signature for a group of people.

In the single protocol, SignShare takes the fingerprint image from a user and follows the standard NIST Bozorth matcher algorithm to extract the minutiae points, minutiae point file, and pair-table data (Distance, Angle $Beta_1$, Angle $Beta_2$, Theta Angle, and two pair nodes of minutia points) and to create a gallery pair table G. Each row $g_i$ in the gallery pair table G contains data identifying a pair of minutiae of the fingerprint by the Distance, Angle $Beta_1$, Angle $Beta_2$, Theta Angle, and two pair nodes of minutia points. Next SignShare takes the private data of the pair-table (Distance, Angle $Beta_1$, and Angle $Beta_2$) and applies the secret sharing scheme to split the private data into N multiple shares so that the shares of the user ID equal the shares of fingerprint data, and determines the threshold, S, of shares needed to retrieve the data. The remaining data from the gallery pair table, the Theta Angle, and two pair nodes of minutia points, are stored as plain text. SignShare requests or creates a user ID, applies the secret sharing scheme and splits the user ID into N shares. Thereupon, SignShare hides a share of the user ID inside a share of the user ID in each row (N rows) of the gallery table of fingerprint data. The modified pair table is referred to as T and each row is referred to as $t_i$. Finally, SignShare distributes these N shares over multiple cloud storage locations where no single cloud stores the all of the S threshold shares that are required to reconstruct the user ID. To authenticate and perform the signature. SignShare requires a threshold number S of shares to be downloaded from the cloud storage locations.

Algorithm 1 for the enrollment operation of SignShare for a single signer protocol is shown below. For the single signer protocol, SignShare takes a fingerprint image from each user by means of a fingerprint reader, and extracts a minutia points file. The algorithm creates a secret (a user ID, for example) and hides it with the single user's fingerprint data.

Figure 4:
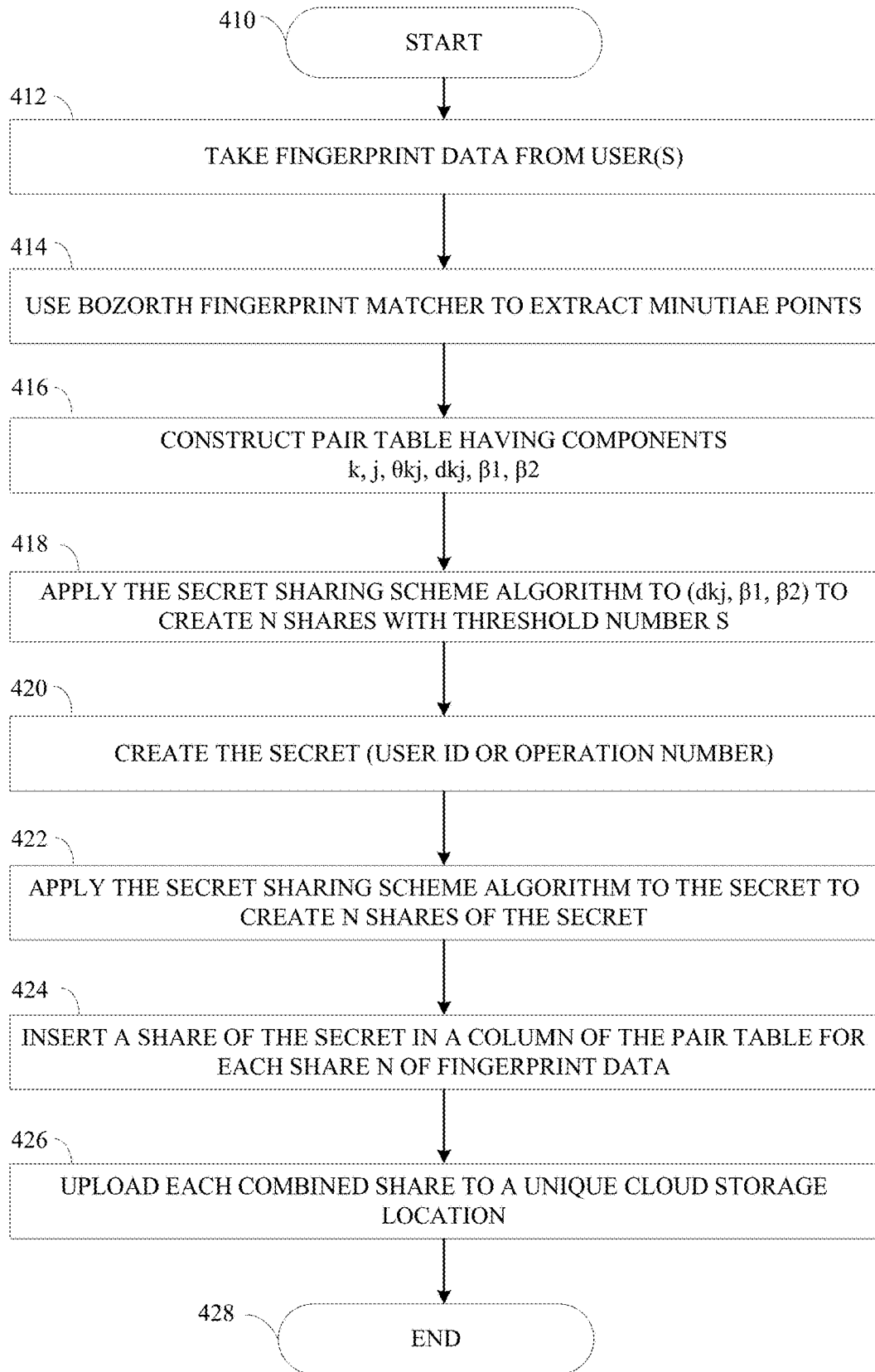
FIG. 4 is an exemplary flowchart for enrollment, according to certain embodiments.

FIG. 2 shows the layout of the pair table data for a share of the single protocol stored in the cloud. Each row $t_i$ of the pair table data (k, j, $\theta_{kj}$) contains shares of ($d_{kj}$, $\beta_1$, $\beta_2$) combined with a share of the secret user ID. A flowchart of the single protocol or group protocol is shown in FIG. 4.

Algorithm 1: Single Protocol Enrollment

Data: Gallery fingerprint image $g_i$ where i=1, 2, . . . . , n (412)

Result: Shares of the gallery fingerprint data (pair-table $t_i$) combined with shares of the secret (user ID).

For each gallery fingerprint image $g_i$:
- (414) extract minutiae points $m_i$ from fingerprint image $g_i$;
- (416) construct a pair-table $t_i$ from the minutiae points $m_i$, where each row in the pair-table $t_i$ contains (k, j, $\theta_{kj}$, $d_{kj}$, $\beta_1$, $\beta_2$);
- (418) split the first last three components of the pair-table $t_i$ data ($d_{kj}$, $\beta_1$, $\beta_2$) into N shares using the secret sharing scheme;
- (418) determine the threshold number S of shares from the pair-table $t_i$ data ($d_{kj}$, $\beta_1$, $\beta_2$) shares using the secret sharing scheme;
- (420) create the secret;
- (422) divide the secret into N shares and specify the threshold number S of shares for retrieval using the secret sharing scheme;
- (424) hide a share of the secret in a column of the gallery pair-table $t_i$ data ($d_{kj}$, $\beta_1$, $\beta_2$) shares;
- (426) upload all shares of the pair-table $t_1$ data ($d_{kj}$, $\beta_1$, $\beta_2$) with the corresponding shares of the secret to multiple clouds, where no one cloud stores the threshold number S of shares required to reconstruct the secret;

End.

In the group protocol, SignShare creates a secret operation number, applies the secret sharing scheme and splits the operation number into N shares. In this situation, N equals the number of possible signers. Then SignShare takes a fingerprint image from each user of a group of users and follows the process of the NIST matcher algorithm by extracting the minutiae points, minutiae point file, and pair-table (Distance, Angle Beta$_1$, Angle Beta$_2$, Theta Angle, and two pair nodes of minutia points) for each fingerprint image. Next, SignShare takes the private data of the pair-table (Distance, Angle Beta$_1$, and Angle Beta$_2$) and applies the secret sharing scheme to split the private data into N multiple shares, so that the shares of the operation number equal the shares of the fingerprint data. SignShare then hides a share of the operation number inside a share of the fingerprint data of each user. Finally, SignShare distributes these N shares over multiple cloud storage locations where no single cloud stores the entire number of threshold shares that are required to reconstruct the operation number. For signing, SignShare requires a threshold number S of shares to retrieve the operation number and verify the transaction.

FIG. 3 shows the layout of the pair table data of the group protocol stored in the cloud. Each row $t_i$ of the pair table data contains (k, j, $\theta_{kj}$) and shares of ($d_{kj}$, $\beta_1$, $\beta_2$) combined with a share of the secret operation number.

In the group protocol Algorithm 2, the steps of the single signature protocol are followed with small modifications. In the group protocol, fingerprints of multiple users are taken. Shares of a secret operation number are combined with shares of the multiple users fingerprint data.

The algorithm for the enrollment operation of SignShare for the group protocol is shown below and with respect to FIG. 4.

Algorithm 2: Group Protocol Enrollment

Data: Group gallery fingerprint images $g_i$ where i=1, 2, . . . , n (412)

Result: Shares of the gallery fingerprint data (pair-table $t_i$) and shares of the secret operation number.

For each gallery fingerprint image $g_i$:
- (414) extract minutiae points $m_i$ from each of the multiple user fingerprint images $g_i$;
- (416) construct the pair-table $t_i$ from the minutiae points $m_i$, where each row in the pair-table $t_i$ contains (k, j, $\theta_{kj}$, $d_{kj}$, $\beta_1$, $\beta_2$);
- (418) split the last three components of the pair-table $t_i$ data ($d_{kj}$, $\beta_1$, $\beta_2$) into shares using the secret sharing scheme;
- (418) determine the threshold number S of shares from the pair-table $t_i$ data ($d_{kj}$, $\beta_1$, $\beta_2$) shares using the secret sharing scheme;
- (420) create the secret operation number;
- (422) divide the secret operation number into N shares and specify the threshold number S of shares required for retrieval using the secret sharing scheme;
- (424) hide a share of the secret operation number in the gallery pair-table $t_i$ data ($d_{kj}$, $\beta_1$, $\beta_2$) shares;
- (426) upload all shares of the pair-table $t_i$ data ($d_{kj}$, $\beta_1$, $\beta_2$) with the corresponding shares of the secret operation number to multiple clouds, where no one cloud stores the threshold number of shares required to reconstruct the secret;

End

Matching Process

In the matching/signing process, SignShare follows the same steps as in the enrollment process in order to create probe pair table data.

Figure 5:
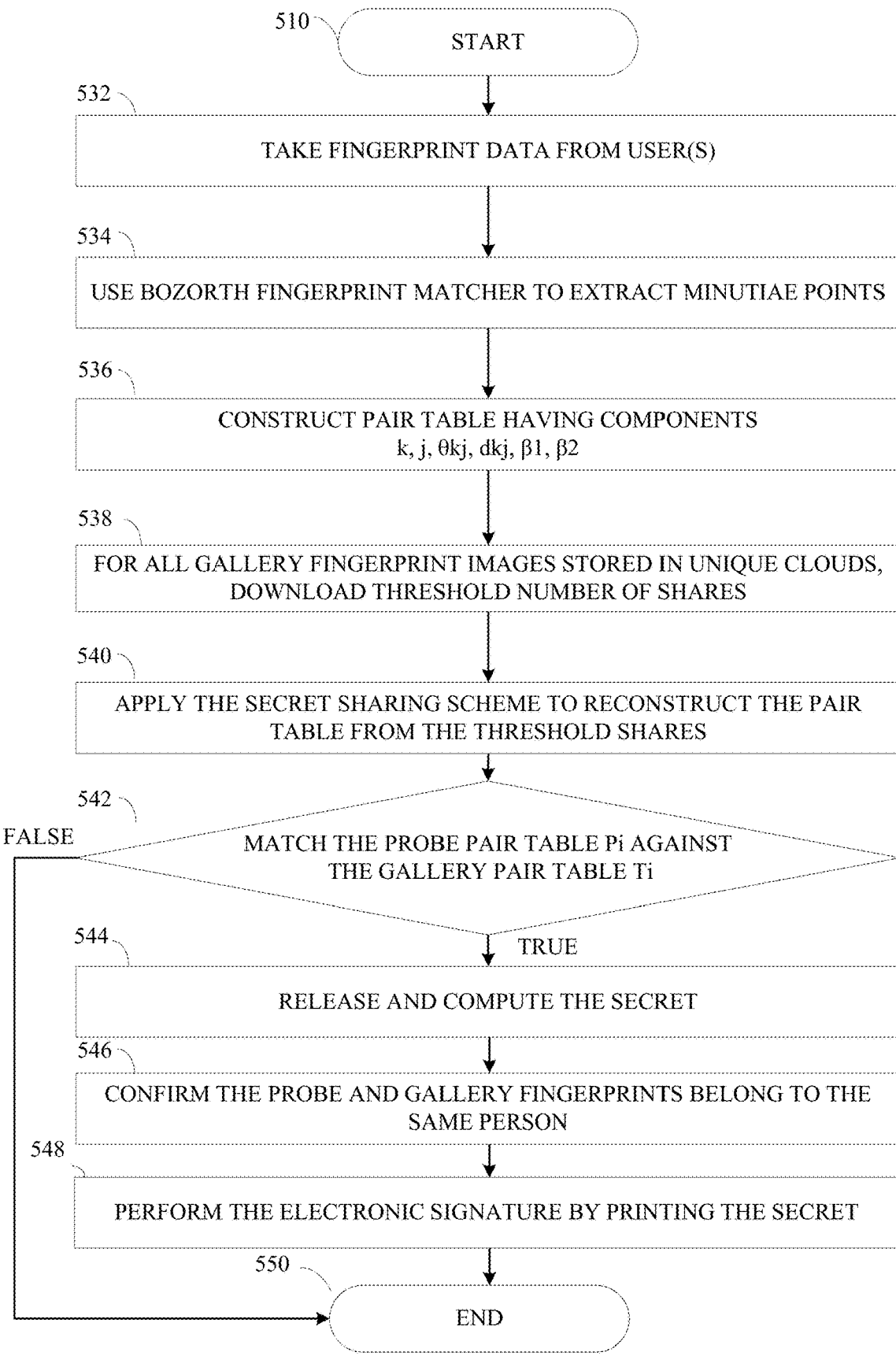
FIG. 5 is an exemplary flowchart for retrieval, according to certain embodiments.

In the single signature protocol, SignShare first takes the fingerprint of the user to be authenticated and then downloads only the threshold shares of the gallery pair-table G data which are combined with shares of the secret. Next, SignShare matches the probe pair table T against the threshold number of gallery pair tables. If the matching is successful, SignShare computes the secret from the threshold shares by applying the sharing secret scheme. Then, SignShare can authenticate the single signature for a user by printing the secret (user ID), time and date. The matching/signing process for either the single or the group protocol is shown in FIG. 5.

Algorithm 3: Single Protocol Fingerprint Authentication and Secret Retrieval

Data: Probe fingerprint image $p_i$ where i=1, 2, . . . , n (532)

Result: Electronic Signature: Print the secret (user ID) and time/date

For each probe fingerprint image $p_i$:
- (534) extract minutiae points $m_i$ from probe fingerprint image $p_i$;
- (536) construct the probe pair-table $t_i$ rows from the minutiae points $m_i$;

For all gallery fingerprint images $p_i$ stored over the multiple clouds:
- (538) download only the S threshold shares of gallery pair tables;
- (540) apply the secret sharing scheme on the S threshold shares in order to reconstruct the pair table from the threshold shares;

For probe and gallery pair-table $t_i$:
- (542) match the probe pair-table $t_i$ against gallery pair-table $g_i$;

If (match=true)
- (544) release the secret hidden inside each gallery pair-table $g_i$;
- (544) compute the secret using the secret sharing scheme;

If the secret shares in the gallery=the secret:
- (546) confirm the probe and gallery fingerprints belong to the same person;
- (548) perform the electronic signature by printing the secret;

Return the signature.

In the matching/signing operation of SignShare for the group protocol, the algorithm matches the group probe fingerprint pair table data of a group of N users against a threshold number of shares of the gallery fingerprint data. If the matching is successful, SignShare computes the secret operation number from the threshold shares by applying the secret sharing scheme and releases the threshold shared secret operation number. After authenticating the threshold number of fingerprints, the SignShare algorithm prints the secret operation number and time/date.

The algorithm for the matching/signing operation of SignShare for the group protocol is shown below.

Algorithm 4: Group Protocol Fingerprint Authentication and Secret Retrieval

Data: Group probe fingerprint image $p_i$ where i=1, 2, ..., n. (532)

Result: Electronic Signature: Print the secret (operation number) and time/date.

For each probe fingerprint image $p_i$:
- (534) extract minutiae points $m_i$ from each probe fingerprint image $p_i$;
- (536) construct the probe pair-table $t_i$ from the minutiae points $m_i$;

For all gallery fingerprint images $p_i$ stored over the multiple clouds:
- (538) download only the threshold shares of gallery pair tables;
- (540) apply the secret sharing scheme on the threshold shares in order to reconstruct the pair tables from the threshold shares;

For probe and gallery pair-table $t_i$:
- (542) match the probe pair-table $t_i$ against gallery pair-table $g_i$;

If (match=true)
- (544) release the secret hidden inside each gallery pair-table $g_i$;
- (544) compute the secret operation number using the secret sharing scheme;

If the secret shams in the gallery=the secret:
- (546) confirm the probe and gallery fingerprints belong to the each one of the threshold number of multiple users;
- (548) perform the electronic signature by printing the secret;

Return the signature.

The SignShare service may be implemented in any one of a personal computer, a company computer, a cloud computing environment, a web application residing on one or more servers, a website, in a blockchain system and a distributed server system.

Figure 6:
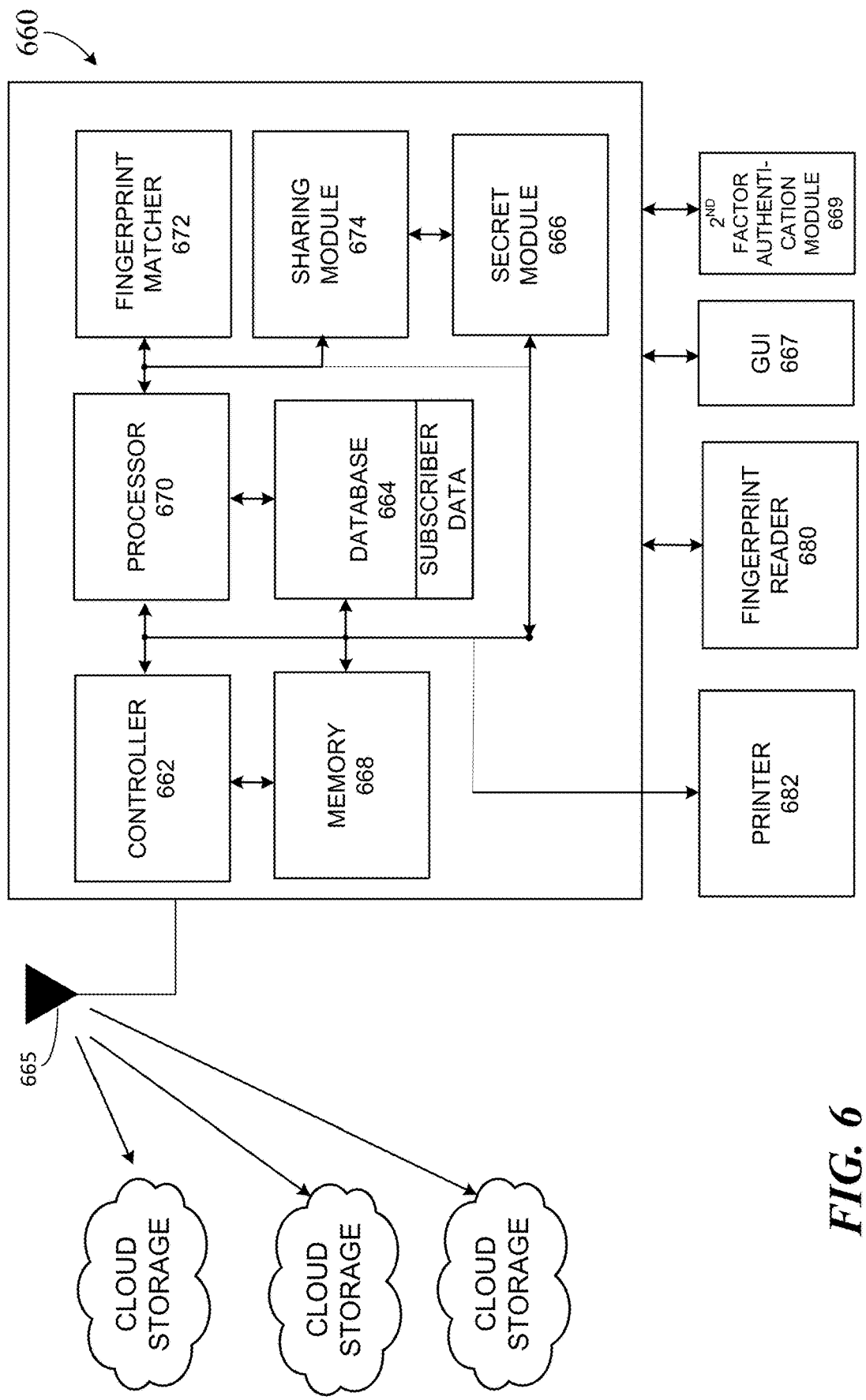
FIG. 6 is an exemplary illustration of a SignShare service, according to certain embodiments.

As shown in FIG. 6, the SignShare service 660 may include a controller 662, at least one database 664 including at least subscriber data, at least one transceiver (not shown), at least one memory 668 including program instructions, a graphical user interface (GUI) 667, a display 669, a processor 670 including analysis circuitry configured to use the program instructions to analyze subscriber information received from controller 662, check the subscriber information against subscriber records in database 664 to verify subscriber information and return the verification to the controller 662 for communication with the subscriber. "Subscriber" as used herein refers to any individual, group of individuals, company, government institution, law office, or the like, which has registered with the SignShare service for authentication of electronic signatures using biometric data.

A subscriber, a user of the service or a group of users may desire to verify their electronic signatures using the SignShare service. Each user enters his/her finger in, on or near fingerprint reader 680. The fingerprint reader is not limited and may be a separate device, such as the P2000 Fingerprint Device sold by Zvetco Biometrics. http://www.zvetcobiometrics.com/Products/P2000/overview.php Alternatively, the fingerprint reader may be an application on a smart device which allows a user to use a touchscreen or a button to enter a fingerprint.

Controller 662 receives the fingerprint data and sends it to processor 670. Processor 670 sends the fingerprint data to the Bozorth Fingerprint Matcher 672 to generate the gallery pair table for the fingerprint.

The processing circuitry of the SignShare service residing on the server can carry out instructions to perform or cause performance of various functions, operations, steps or processes of the system. The controller 662 and processing circuitry 670 can be configured to store information in memory 668, operate the system 660, and receive and send information in the form of signal(s) between the fingerprint reader 680, the graphical user interface 667, the display 669, the printer 682, and the transceiver 666.

The database 664 can represent one or more local and/or external databases and/or memory communicably coupled to SignShare controller 662.

The processor extracts the $Distance_{kj}$, $Beta_1$ and $Beta_2$ data from the pair table data and sends it to the secret sharing scheme module 666. The secret sharing scheme module splits the data into N shares and generates the threshold number S of shares needed to retrieve the data.

The processor creates a secret in secret module 666. The secret is entered in to the secret sharing scheme module 674 to be divided into N shares.

The processor 670 then combines each share of the $Distance_{kj}$, $Beta_1$ and $Beta_2$ with a share of the secret. Each combined share is then sent to the controller to be stored at a separate cloud storage location.

For retrieval of the secret, a signer or a number of signers, equal to the threshold number S, enter their fingerprints in the SignShare service by fingerprint reader 680 or electronic means. The processor 670 applies the fingerprints to the fingerprint matcher, which extracts the probe data $Distance_{kj}$, $Beta_1$ and $Beta_2$ from each fingerprint.

The processor then downloads a threshold number of shares from the cloud storage locations. The shares are entered into the secret sharing scheme module to release the stored Distance$_{kj}$, Beta$_1$ and Beta$_2$ shares and shares of the secret. The processor matches the fingerprint probe data against the gallery data stored in the cloud (Distance$_{kj}$, Beta$_1$ and Beta$_2$ shares) and releases the secret if the records match.

The controller 662 then prints the secret and the date to authenticate the signers.

The first embodiment is described with respect to FIG. 4, 5.6. The first embodiment describes a SignShare service 660 for authenticating an electronic signature using a biometric fingerprint. The service includes a fingerprint reader 680, a controller 662, a processor 670 connected to the controller, a transceiver 666, a memory 668 storing program instructions, a database 664.

The SignShare service further includes a fingerprint matcher 672 connected to the processor, wherein the fingerprint matcher has program instructions for extracting fingerprint minutiae and constructing a gallery pair table of the fingerprint minutia, a secret module 666 for generating a secret (user ID, operation number), a sharing module 674 connected to the processor, wherein the sharing module has program instructions for splitting data into N shares and assigning a threshold number S of shares needed to retrieve the data, where N≥2S−1, where N and S are integers greater than 1, and where N is the number of minutiae pairs.

The controller 662 has circuitry configured to receive a subscriber request to record a fingerprint, cause the fingerprint reader 680 to record fingerprint data, cause the secret module 666 to generate a secret, and to instruct the processor to apply the fingerprint data to the fingerprint matcher 672, apply the fingerprint minutiae to the sharing module 674 to generate N fingerprint minutiae shares and the threshold number S, apply the secret to the sharing module 674 to generate N shares of the secret, combine the N shares of the fingerprint minutiae shares and the N shares of the secret to generate N combined shares.

The controller 662 further has circuitry configured to cause the transceiver 665 to transmit each share of the N combined shares to a unique cloud storage location of a plurality of cloud storage locations.

In order to register a user to the SignShare service, where the user can be any of a single person, a group of persons, a company, a government office, or the like, the SignShare service uses the following procedure.

The controller further has circuitry configured to receive registration information from a user who wishes to subscribe to the SignShare service, record the registration information in the database 664; request a SignShare password from the user; store the SignShare password of the user with the registration information in the database 664; and register the user as a subscriber of the SignShare service. In order to access the SignShare service, the subscriber enters the SignShare password.

The fingerprint matcher may be a NIST Bozorth Fingerprint Matcher, although any fingerprint matcher capable of constructing a gallery pair table of fingerprint minutiae may be used.

The sharing module 674 has program instructions configured to run a secret sharing scheme algorithm.

The SignShare service optionally has a a second factor authentication module 669 connected to the controller, wherein the second factor authentication module has circuitry configured to generate a verification number; wherein the controller has circuitry configured to cause the transceiver to transmit the verification number to a personal computing device of the subscriber with a request for the subscriber to enter the verification number on the personal computing device; wherein the controller has circuitry configured to receive the entered verification number as a second authentication of the electronic signature.

The second embodiment to a SignShare method for authenticating an electronic signature using a biometric fingerprint is described with respect to FIG. 4, 5, 6.

The SignShare method starts by imaging, by a fingerprint reader 680, a fingerprint of at least one signer (412); extracting (414), by a processor 670, a plurality of minutia pairs of the fingerprint and forming a gallery pair table $G_i$ using the minutia pairs; splitting (418), by the processor, the gallery pair table $G_i$ into N shares and determining a threshold number S of shares according to the equation N≥2S−1, where N and S are integers greater than 1, and where N is the number of minutiae pairs; generating, by the processor, a secret (420); splitting (422), by the processor, the secret into N shares; combining (424), by the processor, the gallery pair table shares and the secret shares to form N combined shares; and uploading (426), by a transceiver, each combined share to a unique cloud storage location of a plurality of cloud storage locations.

The SignShare method includes receiving, by the controller 662, registration information from a user who wishes to subscribe to the SignShare service, recording, by the controller, the registration information in the database 664; requesting, by the controller, a SignShare password from the user; storing, by the controller, the SignShare password of the user with the registration information in the database; and registering, by the controller, the user as a subscriber of the SignShare service. If a subscriber wants to access the SignShare service, the subscriber enters the SignShare password.

Once the subscriber is enrolled in the service and enters the password, the subscriber can request the controller authenticate the biometric fingerprints of a signer as shown in FIG. 5. The method includes imaging, by a fingerprint reader 680, the fingerprint of a signer (532); constructing a gallery pair table G from the fingerprint (534, 536) and storing the gallery pair table G in the database 664.

The SignShare method continues by downloading a threshold number of combined shares from the cloud storage locations (538); reconstructing, by the secret sharing module, the gallery pair table G of each of the combined shares (540); matching the probe pair table $T_i$ against the gallery pair table $G_i$ (542); if a threshold number of probe pair tables $T_i$ match the gallery pair table $G_i$, releasing and computing the secret (544), and printing the secret and the date to authenticate the digital signature of the signer (548).

If a threshold number of probe pair tables $T_i$ do not match the gallery pair table $G_i$, (False, 542) transmitting a message to the subscriber denying authentication of the biometric fingerprint of the signer.

The SignShare method of the second embodiment further records the signatures of a group of signers as shown in FIG. 4. The method includes imaging, by the fingerprint reader 680, the fingerprints of a plurality of signers (412); extracting, by the processor 670, a plurality of minutia pairs of each fingerprint (414) and forming gallery pair tables $G_i$ for each fingerprint (416); splitting, by the processor, the gallery pair table data into N shares (418); creating a secret and splitting the secret into N shares (420, 422) combining, by the processor, the gallery pair table shares for each signer and the secret shares to form N combined shares (424); uploading, by a transceiver 666, each combined share to a unique cloud storage location of a plurality of cloud storage locations (426).

As shown in FIG. 5, the SignShare method of the second embodiment further comprises receiving, by the controller 662, a request from a subscriber to authenticate the biometric fingerprints of a threshold number of signers; imaging, by a fingerprint reader 680, a fingerprint of each signer (532); constructing a probe pair table $T_i$ for the fingerprint of each signer (536); storing the gallery pair table $T_i$ of each signer in the database 664; downloading a threshold number of combined shares from the cloud storage locations (538); reconstructing, by the secret sharing module, the gallery pair table $G_i$ of each of the combined shares (540) and matching the probe pair table $T_i$ against the gallery pair table $G_i$ (542).

If a threshold number of probe pair tables $T_i$ match the gallery pair table $G_i$ (True, 542), releasing and computing the secret (544), and printing the secret and the date to authenticate the digital signatures (548).

If a threshold number of probe pair tables $T_i$ do not match the gallery pair table $G_i$ (False, 542), transmitting a message to the subscriber denying authentication of the biometric fingerprints of the signers.

For either the single signer or the multiple signers, before the step of printing the secret and date, a second factor verification may be used (546), by generating, by a second factor verification module 669, a verification number; transmitting, by the controller, the verification number to a personal computing device of the subscriber with a request for the subscriber to enter the verification number on the personal computing device; receiving the entered verification number and, if the entered verification number is correct, printing the secret and the date to authenticate the digital signature(s).

The third embodiment is shown with respect to FIG. 4, 5, 6 and is to a non-transitory computer readable medium having instructions stored therein that, when executed by one or more processors, causes the one or more processors to perform a SignShare method for authenticating an electronic signature using a biometric fingerprint, comprising: imaging, by a fingerprint reader 680, a fingerprint of at least one signer (412); extracting (414), by a processor 670, a plurality of minutia pairs of the fingerprint and forming a gallery pair table $G_i$ using the minutia pairs; splitting (418), by the processor, the gallery pair table $G_i$ into N shares and determining a threshold number S of shares according to the equation N≥2S−1, where N and S are integers greater than 1, and where N is the number of minutiae pairs; generating, by the processor, a secret (420); splitting (422), by the processor, the secret into N shares; combining (424), by the processor, the gallery pair table shares and the secret shares to form N combined shares; and uploading (426), by a transceiver, each combined share to a unique cloud storage location of a plurality of cloud storage locations.

The third embodiment includes receiving, by the controller 662, registration information from a user who wishes to subscribe to the SignShare service, recording, by the controller, the registration information in the database 664; requesting, by the controller, a SignShare password from the user; storing, by the controller, the SignShare password of the user with the registration information in the database; and registering, by the controller, the user as a subscriber of the SignShare service. If a subscriber wants to access the SignShare service, the subscriber enters the SignShare password.

Once the subscriber is enrolled in the service and enters the password, the subscriber can request the controller authenticate the biometric fingerprints of a signer as shown in FIG. 5. The third embodiment includes imaging, by a fingerprint reader 680, the fingerprint of a signer (532); constructing a probe pair table $T_i$ from the fingerprint (534, 536) and storing the probe pair table $T_i$ in the database 664.

The third embodiment continues by downloading a threshold number of combined shares from the cloud storage locations (538); reconstructing, by the secret sharing module, the gallery pair table $G_i$ of each of the combined shares (540); matching the probe pair table $T_i$ against the gallery pair table $G_i$ (542); if a threshold number of probe pair tables $T_i$ match the gallery pair table $G_i$, releasing and computing the secret (544), and printing the secret and the date to authenticate the digital signature of the signer (548).

If a threshold number of probe pair tables $T_i$ do not match the gallery pair table $G_i$, (False, 542) transmitting a message to the subscriber denying authentication of the biometric fingerprint of the signer.

The third embodiment further records the signatures of a group of signers as shown in FIG. 4. The method includes imaging, by the fingerprint reader 680, the fingerprints of a plurality of signers (412); extracting, by the processor 670, a plurality of minutia pairs of each fingerprint (414) and forming gallery pair tables $G_i$ for each fingerprint (416); splitting, by the processor, the gallery pair table data into N shares (418); creating a secret and splitting the secret into N shares (420, 422); combining, by the processor, the gallery pair table shares for each signer and the secret shares to form N combined shares (424); uploading, by a transceiver 665, each combined share to a unique cloud storage location of a plurality of cloud storage locations (426).

As shown in FIG. 5, the SignShare non-transitory computer readable medium method of the third embodiment further comprises receiving, by the controller 662, a request from a subscriber to authenticate the biometric fingerprints of a threshold number of signers; imaging, by a fingerprint reader 680, a fingerprint of each signer (532); constructing a probe pair table $T_i$ for the fingerprint of each signer (536); storing the probe pair table $T_i$ of each signer in the database 664; downloading a threshold number of combined shares from the cloud storage locations (538); reconstructing, by the secret sharing module, the gallery pair table $G_i$ of each of the combined shares (540) and matching the probe pair table $T_i$ against the gallery pair table $G_i$ (542).

If a threshold number of probe pair tables T match the gallery pair table $G_i$, (True, 542) releasing and computing the secret (544), and printing the secret and the date to authenticate the digital signatures (548).

If a threshold number of probe pair tables $T_i$ do not match the gallery pair table $G_i$ (False, 542), transmitting a message to the subscriber denying authentication of the biometric fingerprints of the signers.

For either the single signer or the multiple signers, before the step of printing the secret and date, a second factor verification may be used (546), by generating, by a second factor verification module 669, a verification number; transmitting, by the controller, the verification number to a personal computing device of the subscriber with a request for the subscriber to enter the verification number on the personal computing device; receiving the entered verification number and, if the entered verification number is correct, printing the secret and the date to authenticate the digital signature(s).

A non-limiting example of using SignShare to authenticate a user signature follows.

In this situation, a user needs to perform an electronic signature remotely for a legal document in a government office. The government office requires a signature which cannot be repudiated.

The government office utilizes the SignShare service. First, SignShare takes a fingerprint of the user and applies the secret sharing scheme to split the user ID into multiple shares equal to the number of clouds that store the user fingerprint data.

The SignShare service steps for a single user are described below in more detail.

To register:
1. Take a fingerprint from a user.
2. Split the user ID into eight shares and determine the threshold shares (three shares) by using the secret sharing scheme.
3. Embed each share of a user ID in his/her a fingerprint data share.
   There are now eight shares that have been embedded inside eight fingerprint shares for a user.
4. Distribute the fingerprint data over eight cloud storage locations where no single cloud stores the threshold number of shares (three) that are required to reconstruct the secret.

To sign the government document:
5. The user provides his/her fingerprint, by inserting his/her finger in a fingerprint reader.
6. SignShare downloads three shares from the cloud storage locations and matches the fingerprint against the threshold gallery.
7. If the fingerprint is successfully matched, the user ID is released and the electronic signature is performed.
8. The government office receives the electronic signature online, and the government office can prove the identity of the user by the fingerprint authentication and second factor authentication with the user ID.

Second factor authentication may include asking the user to enter his/her pin or password and matching the pin or password against the user ID. Alternatively, the secret user ID may be a user phone number and SignShare may send a one-time password to the user mobile device to verify the transaction, as is commonly known.

In a second example, a group protocol of the enrollment process is described.

The following is a non-limiting of using a group signature to cash a check.

A company protocol requires a large check to be signed by at least three of five managers in a company. A $50,000 check is presented for signature. If a traditional hand writing signature or an electronic signature is used, one or more managers may claim his/her signature was forged after the check is cashed. An accountant for the firm cannot prove that the handwriting/electronic signature was provided by the dissenting manager.

SignShare Solution:

The five managers each register with the SignShare service by entering their fingers in a fingerprint reader. A secret operation number (group ID) is created and is split into five shares. A threshold number of three shares are needed to release the secret operation number to sign the check. To provide the non-repudiation and authentication, the fingerprint data is used as detailed in the following SignShare process steps.

To register:
1. Take a fingerprint from each of the five managers.
2. Create a secret operation number (group ID), split into five shares and determine the threshold number of shares (three shares) for retrieval by using secret sharing scheme.
3. Embed a share of the secret operation number in the fingerprint data of each manager. There are now five shares which have been embedded inside the fingerprint data for the five managers.
4. Distribute the fingerprint data over multiple cloud storage locations where no single cloud stores the threshold shares required to reconstruct the secret operation number.

To sign the check:
5. The accountant needs at least three managers out of five to cash the check. Each manager must sign by using his/her fingerprint in order to perform the signature.
6. SignShare downloads three sets of fingerprint data from the storage locations and matches each manager's fingerprints against the downloaded fingerprint data. SignShare then releases the shared operation number to cash or deposit the check.
7. The accountant has non-repudiation proof that each manager has approved his/her signature.

Figure 7:
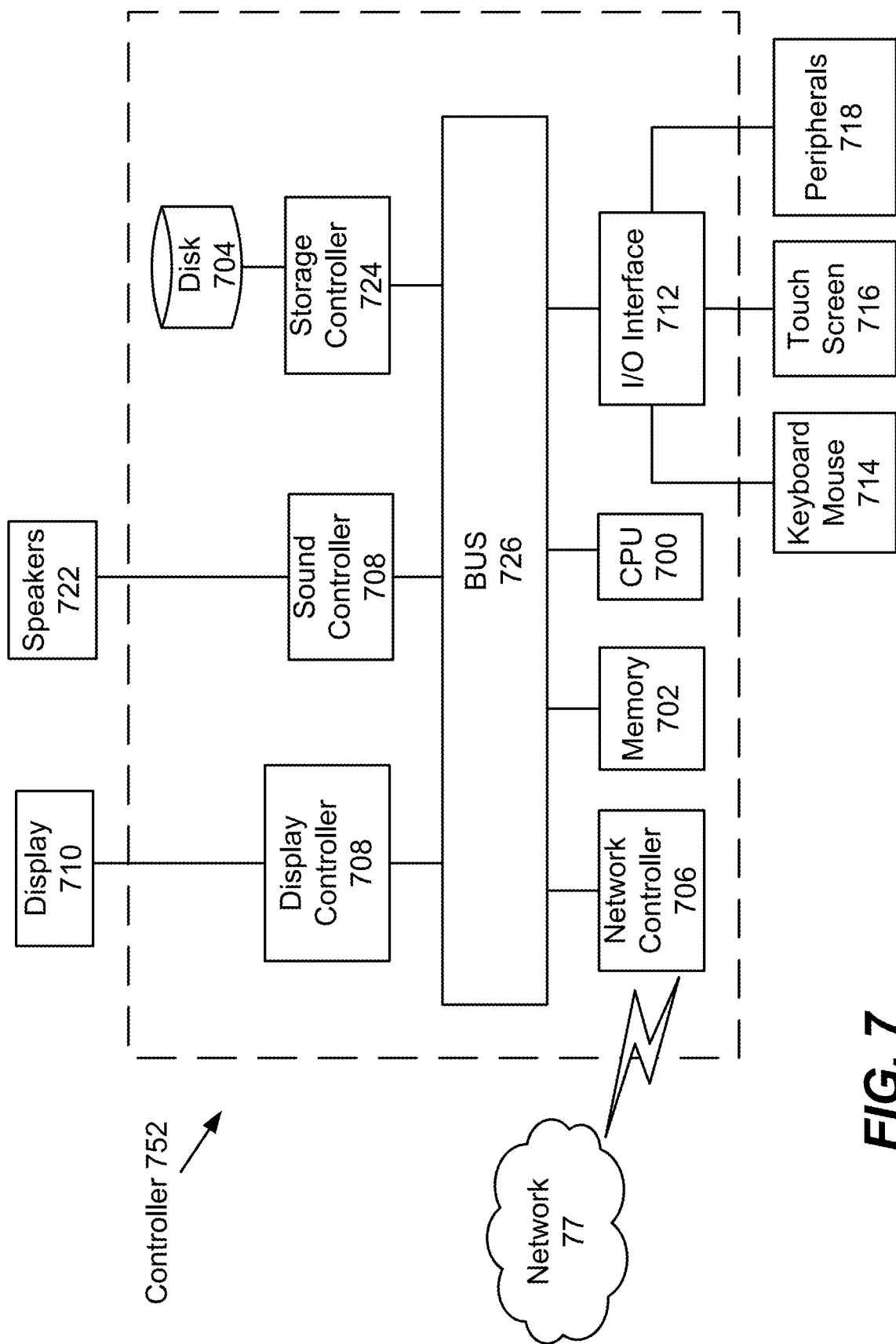
FIG. 7 is an illustration of a non-limiting example of computing hardware used in the SignShare service, according to certain embodiments.

Next, a hardware description of the controller 662 according to exemplary embodiments is described with reference to FIG. 7. In FIG. 7, the controller 752 described is representative of the controller 662 in which the controller is computing device which includes a CPU 700 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA. ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN subnetworks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
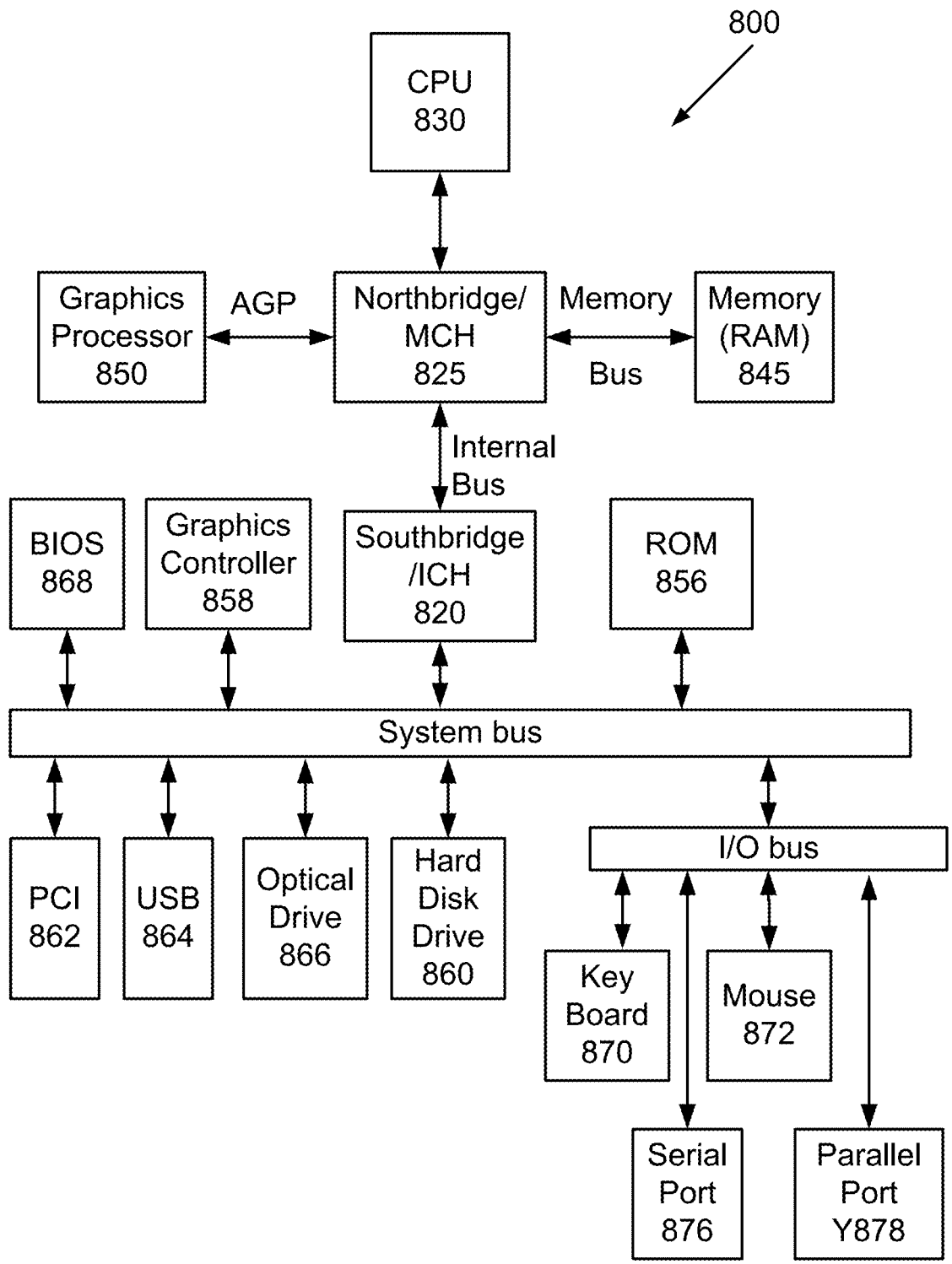
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
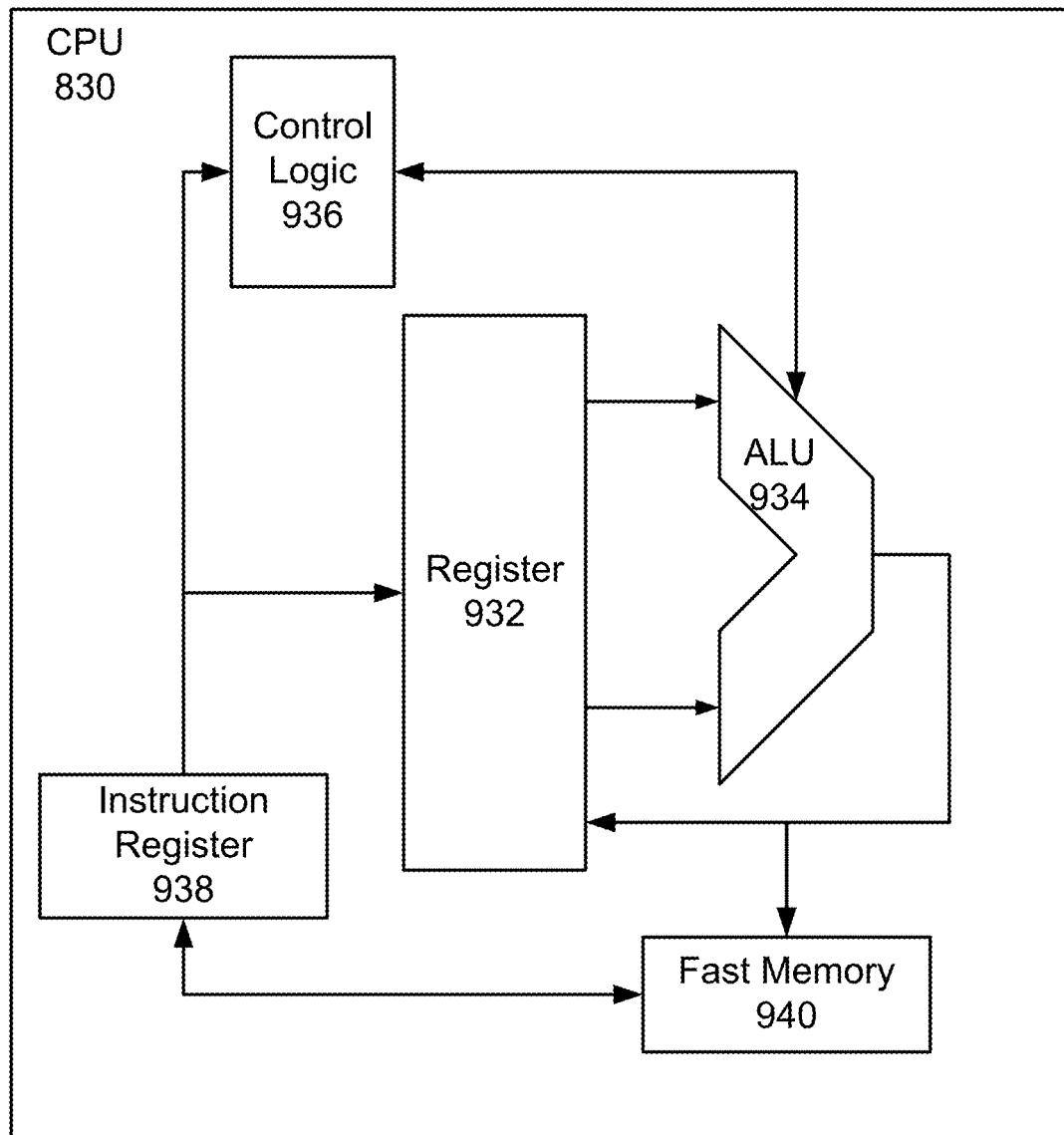
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
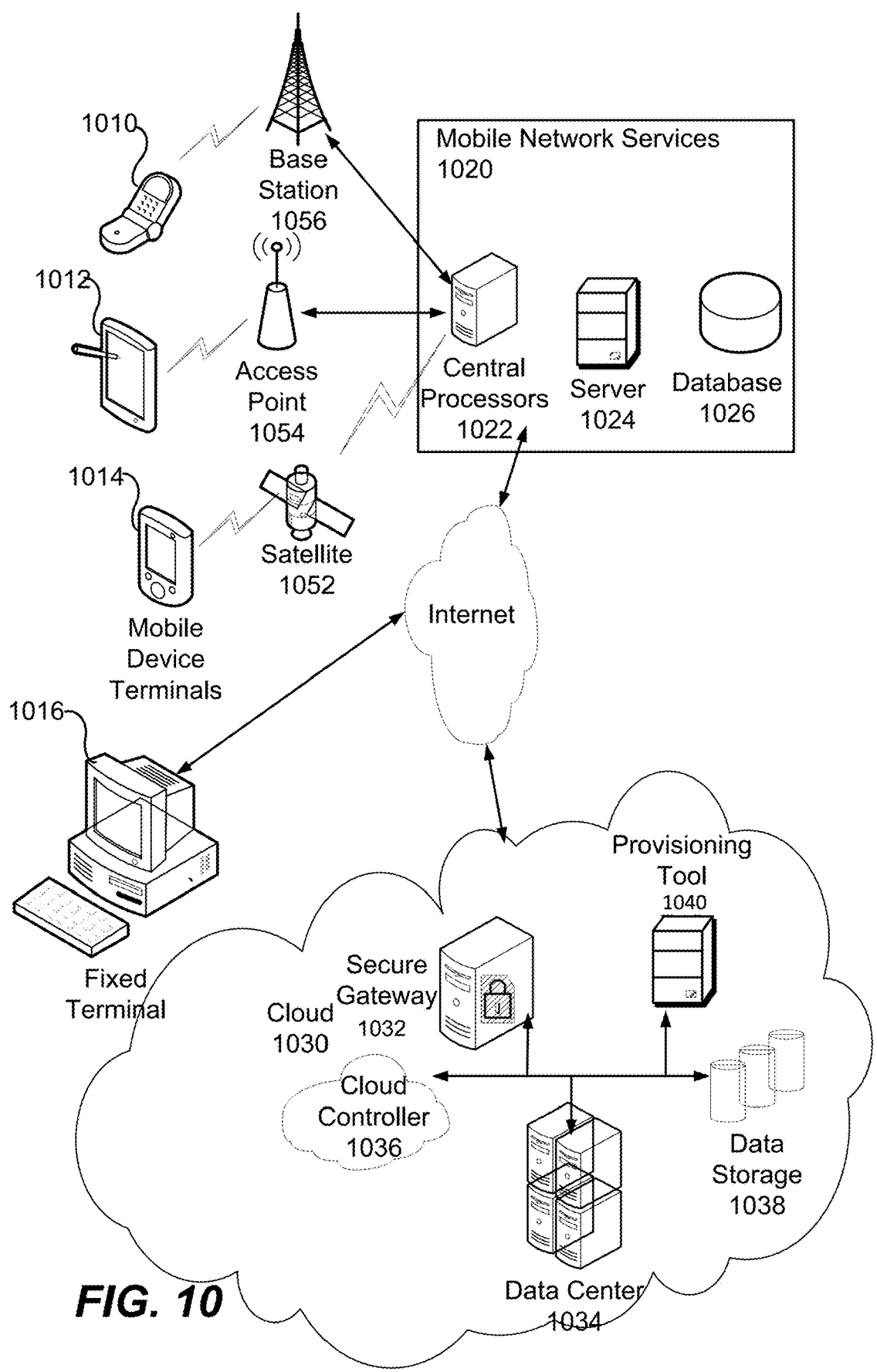
FIG. 10 is an illustration of a non-limiting example of distributed components which may share processing with the SignShare controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. An electronic signature authentication method using a biometric fingerprint, comprising:
   imaging, by a fingerprint reader, a fingerprint of at least one signer;
   extracting, by a processor, a plurality of minutia pairs of the fingerprint and forming a gallery pair table $G_i$ and a probe pair table using the minutia pairs;
   splitting, by the processor, the gallery pair table $G_i$ into N shares and determining a threshold number S of shares according to the equation N≥2S−1, where N and S are integers greater than 1, and where N is the number of minutiae pairs;
   generating, by the processor, a secret;
   splitting, by the processor, the secret into N shares;
   combining, by the processor, the gallery pair table shares and the secret shares to form N combined shares;
   uploading, by a transceiver, each combined share to a unique cloud storage location of a plurality of cloud storage locations;
   receiving, by a controller, registration information from a user requesting access as a subscriber to an electronic signature authentication program;
   recording, by the controller, the registration information in a database;
   requesting, by the controller, a password from the user;
   storing, by the controller, the password of the user with the registration information in the database; and
   registering, by the controller, the user as the subscriber;
   receiving, by the controller, a request from the subscriber to authenticate fingerprints of the at least one signer;
   constructing the probe pair table $T_i$ from the fingerprint of the at least one signer;
   storing the probe pair table $T_i$ in the database;
   entering, by the subscriber, the password to the electronic signature authentication program;
   downloading a threshold number of downloaded combined shares from the cloud storage locations;
   reconstructing, by a secret sharing module, the gallery pair table $G_i$ of each of the downloaded combined shares;
   matching the probe pair table $T_i$ against the gallery pair table $G_i$;
   if a threshold number of probe pair tables $T_i$ match the gallery pair table $G_i$, releasing and computing the secret, and printing the secret and a date to authenticate a digital signature of the at least one signer;
   if a threshold number of probe pair tables $T_i$ do not match the gallery pair table $G_i$, transmitting a message to the subscriber denying authentication of the fingerprint of the at least one signer.

2. The electronic signature authentication method of claim 1, further comprising:
   imaging, by a fingerprint reader, additional fingerprints of a plurality of signers;
   extracting, by the processor, an additional plurality of minutia pairs of each fingerprint and forming additional gallery pair tables $G_i$ for each fingerprint;
   splitting, by the processor, the additional gallery pair tables into N shares;
   combining, by the processor, the additional gallery pair table shares for each signer and the secret shares to form additional N combined shares;
   uploading, by a transceiver, each additional combined share to a unique cloud storage location of a plurality of cloud storage locations.

3. The electronic signature authentication method of claim 2, further comprising
   receiving, by the controller, a request from the subscriber to authenticate the fingerprints of a threshold number of the signers;
   imaging, by a fingerprint reader, a fingerprint of each of the signers;
   constructing a probe pair table $T_i$ for the fingerprint of each of the signers;
   storing the probe pair table $T_i$ of each of the signers in the database;
   downloading a threshold number of combined shares from the cloud storage locations;
   reconstructing, by a secret sharing module, the additional gallery pair table $G_i$ of each of the additional combined shares;
   matching the probe pair tables $T_i$ of each of the signers against the additional gallery pair table $G_i$;
   if a threshold number of probe pair table $T_i$ of each of the signers match the additional gallery pair table $G_i$, releasing and computing the secret, and printing the secret and a date to authenticate digital signatures of the signers;
   if a threshold number of probe pair table $T_i$ of each of the signers do not match the additional gallery pair table $G_i$,
   transmitting a message to the subscriber denying authentication of the fingerprints of the signers.

4. The electronic signature authentication method of claim 3, further comprising, before a step of printing the secret and date,
   generating, by a second factor verification module, a verification number;
   transmitting, by the controller, the verification number to a personal computing device of the subscriber with a request for the subscriber to enter the verification number on the personal computing device;
   receiving the entered verification number; if the entered verification number is correct, printing the secret and a signature date to authenticate the digital signatures of the signers.

5. The electronic signature authentication method of claim 1, further comprising, before the step of printing the secret and date,
   generating, by a second factor verification module, a verification number;
   transmitting, by the controller, the verification number to a personal computing device of the subscriber with a request for the subscriber to enter the verification number on the personal computing device;
   receiving the entered verification number; if the entered verification number is correct, printing the secret and the date to authenticate the digital signature.

6. A non-transitory computer readable medium having instructions stored therein that, when executed by one or more processors, causes the one or more processors to perform electronic signature authentication method using a biometric fingerprint, comprising:

imaging, by a fingerprint reader, a fingerprint of at least one signer;

extracting, by a processor, a plurality of minutia pairs of the fingerprint and forming gallery pair table $G_i$ using the minutia pairs;

splitting, by the processor, the gallery pair table $G_i$ into N shares and determining a threshold number S of shares according to the equation N≥2S−1, where N and S are integers greater than 1, and where N is the number of minutiae pairs;

generating, by the processor, a secret;

splitting, by the processor, the secret into N shares;

combining, by the processor, the gallery pair table shares and the secret shares to form N combined shares;

uploading, by a transceiver, each combined share to a unique cloud storage location of a plurality of cloud storage locations;

receiving, by a controller, registration information from a user requesting access as a subscriber to an electronic signature authentication program;

recording, by the controller, the registration information in a database;

requesting, by the controller, a password from the user;

storing, by the controller, the password of the user with the registration information in the database; and registering, by the controller, the user as the subscriber;

entering, by the subscriber, the password to the electronic signature authentication program;

receiving, by the controller, a request from the subscriber to authenticate fingerprints of the at least one signer;

constructing a probe pair table $T_i$ from the fingerprint;

storing the probe pair table $T_i$ in the database;

downloading a threshold number of the downloaded combined shares from the cloud storage locations;

reconstruct, by a secret sharing module, the gallery pair table $G_i$ of each of the downloaded combined shares;

match the probe pair table $T_i$ against the gallery pair table $G_i$;

if a threshold number of probe pair tables $T_i$ match the gallery pair table $G_i$, releasing and computing the secret, then printing the secret and a date to authenticate a digital signature of the at least one signer;

if a threshold number of probe pair tables $T_i$ do not match the gallery pair table $G_i$, transmitting a message to the subscriber denying authentication of the fingerprint of the at least one signer.

7. The non-transitory computer readable medium electronic signature authentication method of claim 6, further comprising:

imaging, by a fingerprint reader, fingerprints of a plurality of signers;

extracting, by the processor, a plurality of minutia pairs of each fingerprint and forming gallery pair tables for each fingerprint;

splitting, by the processor, the gallery pair tables into N shares;

combining, by the processor, the gallery pair table shares for each signer and the secret shares to form N combined shares;

uploading, by a transceiver, each combined share to a unique cloud storage location of a plurality of cloud storage locations.

8. The non-transitory computer readable medium electronic signature authentication method of claim 7, further comprising receiving, by the controller, a request from the subscriber to authenticate fingerprints of a threshold number of the signers;

imaging, by a fingerprint reader, a fingerprint of each of the signers;

constructing a probe pair table $T_i$ for the fingerprint of each of the signers;

storing the probe pair table $T_i$ of each of the signers in the database;

downloading a threshold number of combined shares from the cloud storage locations;

reconstructing, by a secret sharing module, the additional gallery pair table $G_i$ of each of the additional combined shares;

matching the probe pair tables $T_i$ of each of the signers against the additional gallery pair table $G_i$;

if a threshold number of probe pair table $T_i$ of each of the signers match the additional gallery pair table $G_i$, releasing and computing the secret and printing the secret and a date to authenticate digital signatures of the signers;

if a threshold number of probe pair table $T_i$ of each of the signers do not match the additional gallery pair table $G_i$, transmitting a message to the subscriber denying authentication of the fingerprints of the signers.

9. The non-transitory computer readable medium electronic signature authentication method of claim 8, further comprising, before a step of printing the secret and date, generating, by a second factor verification module, a verification number;

transmitting, by the controller, the verification number to a personal computing device of the subscriber with a request for the subscriber to enter the verification number on the personal computing device;

receiving the entered verification number; if the entered verification number is correct, printing the secret and a signature date to authenticate the digital signatures of the signers.

* * * * *